US008607497B2

(12) United States Patent
Green

(10) Patent No.: US 8,607,497 B2
(45) Date of Patent: Dec. 17, 2013

(54) QUICK MOUNT NON-DESTRUCTIVE TEMPORARY MOUNTING APPARATUS

(76) Inventor: Steven A. Green, Spring Hill, KS (US)

(*) Notice: Subject to any disclaimer, the term of this patent is extended or adjusted under 35 U.S.C. 154(b) by 165 days.

(21) Appl. No.: 13/175,784

(22) Filed: Jul. 1, 2011

(65) Prior Publication Data

US 2013/0001385 A1 Jan. 3, 2013

(51) Int. Cl.
*A01K 97/10* (2006.01)
(52) U.S. Cl.
USPC ...... 43/21.2; 43/42.72; 248/219.4; 248/230.8
(58) Field of Classification Search
USPC ............... 43/21.2, 4, 42.72, 54.1; 248/218.4, 248/219.4, 230.1, 230.8
See application file for complete search history.

(56) References Cited

U.S. PATENT DOCUMENTS

| | | | |
|---|---|---|---|
| 1,985,985 A | | 1/1935 | Gerline |
| 2,267,285 A * | | 12/1941 | McCrave ..................... 43/42.72 |
| 2,878,013 A * | | 3/1959 | Piodi ............................... 267/69 |
| 3,564,751 A * | | 2/1971 | Holiman ........................ 43/21.2 |
| 3,789,535 A * | | 2/1974 | Esplin .............................. 43/22 |
| 4,587,757 A * | | 5/1986 | Lirette ............................ 43/21.2 |
| 4,817,323 A | | 4/1989 | Braid |
| 5,301,911 A * | | 4/1994 | Beauchemin ............. 248/218.4 |
| 5,685,103 A * | | 11/1997 | Wiggins ............................ 42/94 |
| 6,065,722 A * | | 5/2000 | LeVasseur et al. ......... 248/230.8 |
| 6,202,964 B1 * | | 3/2001 | Thornhill ................... 248/219.4 |
| 6,591,542 B1 | | 7/2003 | Jordan |
| 6,726,163 B2 * | | 4/2004 | Eppard et al. .............. 248/219.4 |
| 6,805,270 B1 | | 10/2004 | Fraser |
| 6,869,146 B2 * | | 3/2005 | Gollahon ...................... 297/468 |
| 6,926,240 B2 * | | 8/2005 | Goeller ...................... 248/218.4 |
| D523,109 S | | 6/2006 | Palmer |
| 7,341,507 B1 * | | 3/2008 | Julian, Sr. .................... 452/192 |
| 7,476,149 B2 * | | 1/2009 | Burrows ....................... 452/187 |
| 7,797,876 B2 * | | 9/2010 | McKelvey ....................... 43/15 |
| 7,861,987 B2 * | | 1/2011 | Gorsuch et al. ............ 248/219.1 |
| 7,913,980 B1 * | | 3/2011 | Cipriano ....................... 254/393 |
| D641,828 S * | | 7/2011 | Green ........................ D22/134 |
| 8,302,922 B1 * | | 11/2012 | Robinson ................... 248/219.4 |
| 2003/0094553 A1 * | | 5/2003 | Mullis ........................ 248/219.4 |
| 2008/0066366 A1 * | | 3/2008 | Todd ................................ 43/17 |
| 2010/0018102 A1 * | | 1/2010 | Minges ............................ 42/94 |
| 2011/0049315 A1 * | | 3/2011 | Buckbee ................... 248/219.4 |
| 2011/0108596 A1 * | | 5/2011 | Silverman ..................... 224/637 |

OTHER PUBLICATIONS

"ArtyFishAll", http://artyfishall.com/, Accessed Aug. 17, 2011.

* cited by examiner

*Primary Examiner* — Bradley Duckworth
(74) *Attorney, Agent, or Firm* — Law Office of Mark Brown, LLC; Christopher M. DeBacker

(57) ABSTRACT

A temporary mounting apparatus capable of quickly being mounted to and dismounted from a stationary body, such as a tree or a pole, without damaging the stationary body. The mounting apparatus includes an artificial limb which extends away from a base-plate forming the body of the apparatus. A line is suspended from the apparatus which may be used to catch live fish or to store items suspended above the ground.

14 Claims, 6 Drawing Sheets

QUICK MOUNT NON-DESTRUCTIVE TEMPORARY MOUNTING APPARATUS

CROSS-REFERENCE TO RELATED APPLICATIONS

This application claims priority in U.S. Design patent application Ser. No. 29/377,790, filed Oct. 26, 2010, which is incorporated herein by reference.

BACKGROUND OF THE INVENTION

1. Field of the Invention

The present invention relates generally to mounting a temporary mounting apparatus to a tree, pole, or other permanent, stationary body. The mounting system is designed such that it can be quickly mounted and unmounted from the stationary body without causing any permanent damage to the stationary body.

2. Description of the Related Art

Mounting apparatuses such as the present invention are well known in the art. Mounting apparatuses already known include artificial "limbs" which are screwed into the trunk of a tree or other solid wooden body, or are otherwise semi-permanently mounted into a solid body. Existing mounting apparatuses require the user to drill into the solid body and physically attach the mounting apparatus into the body using a screw, a peg, or some other semi-permanent mounting to affix the mounting apparatus to the solid body. These mounting apparatuses require disfiguration and damage to the solid body to which the mounting apparatus is attached, and require significant prep time and installation time before the mounting apparatus can be used.

What is desired is the ability to quickly mount a mounting apparatus to a solid body, such as a tree or a post, without damaging the solid body. The mount should be able to mount quickly to the solid body without sacrificing rigid contact between the mounting apparatus and the body. The mounting apparatus should remain fixedly in place until a user decides to un-mount the apparatus for storage or use elsewhere, at which time the mounting apparatus should quickly detach from the body without leaving lasting damage to the body. The mounting apparatus must be capable of holding a substantial amount of weight without slipping against the solid body or damaging the body. Heretofore there has not been presented a mounting apparatus with these capabilities in the prior art.

SUMMARY OF THE INVENTION

It is an object of the present invention to provide a system for quickly mounting a mounting apparatus to a solid body, such as a tree or a post, without damaging the solid body or requiring permanent or semi-permanent attachment to the body.

It is a further object of the present invention to ensure that the mounting apparatus is capable of quickly mounting to the solid body and unmounting from the solid body when the purposes of the mounting apparatus have been fulfilled.

It is a further object of the present invention to provide a mounting apparatus capable of suspending a substantial amount of weight from the apparatus without the apparatus slipping or moving while attached to a solid body, and without causing damage to the solid body.

It is a further object of the present invention to provide a flexible limb as part of the mounting apparatus capable of resisting forces against the limb and the mounting apparatus without damaging the mounting apparatus itself. The limb may include a line attached to the end capable of suspending an object above the ground, such as camping gear or a fish that has been freshly caught.

It is a further object of the present invention to act as a temporary fishing rod while mounted to a solid body. The flexible limb containing a line is suspended from the mounting apparatus and includes a fishing hook. The flexibility of a limb allows a fish caught on the fishing hook to swim freely within range of the mounting apparatus without causing the mounting apparatus to slip or become unmounted from the solid body, and without damaging the mounting apparatus, the limb, or the solid body.

BRIEF DESCRIPTION OF THE DRAWINGS

In the accompanying drawings, which illustrate the principles of the present invention and an exemplary embodiment thereof.

DETAILED DESCRIPTION OF THE PREFERRED EMBODIMENTS

I. Introduction and Environment

Figure 1:
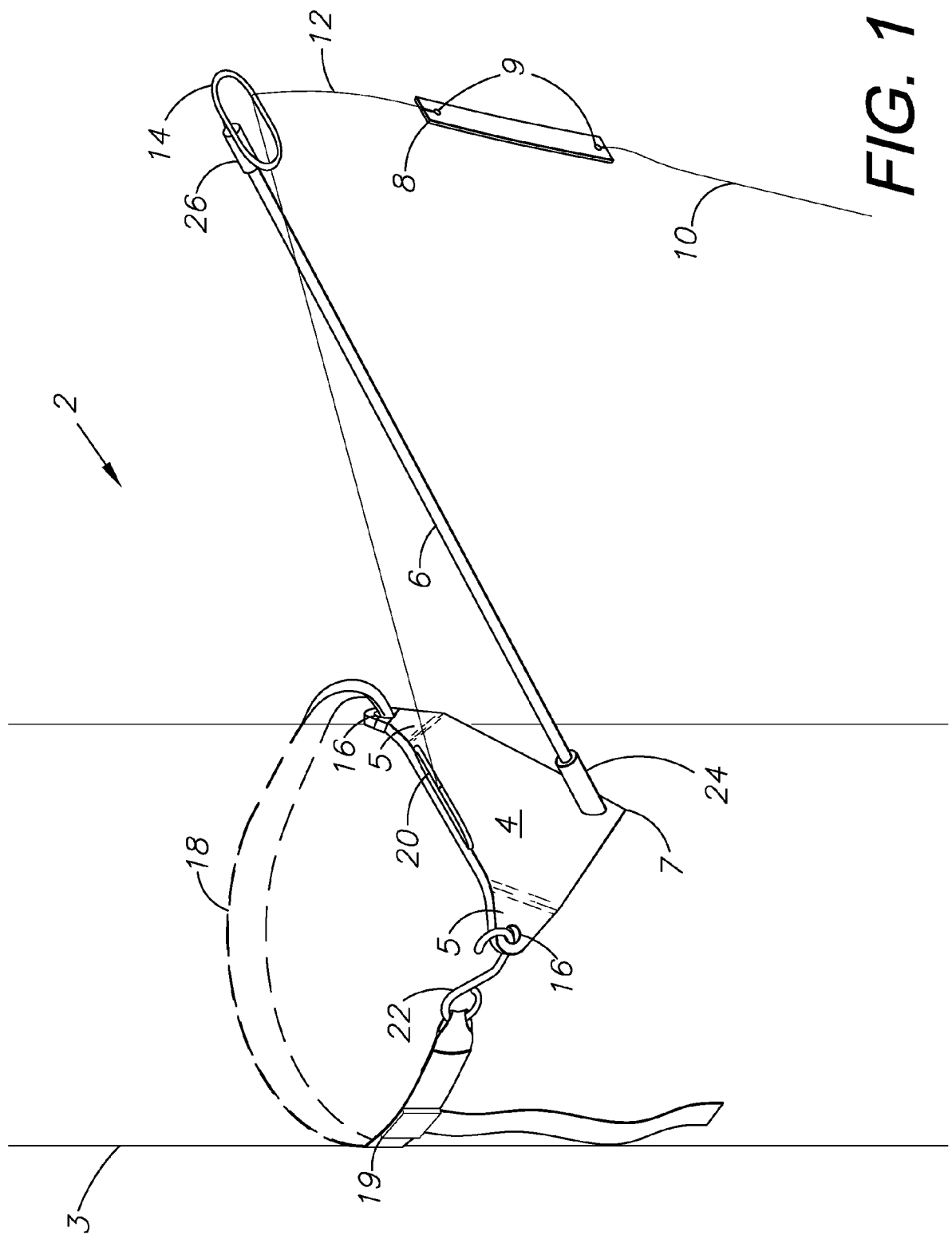
FIG. 1 is a perspective view of a quick mount non-destructive temporary mounting system, including mounting plate, artificial limb, mounting strap, and showing an example of the environment.

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. Said terminology will include the words specifically mentioned, derivatives thereof and words of similar meaning.

The included embodiments of the present invention are typically mentioned with reference to a mounting apparatus 2 which is mounted on a solid body 3 such as a tree or a post. The preferred embodiment of the mounting apparatus 2 includes an artificial limb 6 and a line 12 used to catch fish or to suspend objects above the ground. Other aspects of the preferred embodiment are mentioned as an example to demonstrate the practice of this invention, and not to limit the use of the invention in any manner.

II. Embodiment of a Quick Mount Non-Destructive Temporary Mounting Apparatus 2

An embodiment of a Quick Mount Non-Destructive Temporary Mounting Apparatus ("mounting apparatus") 2 is disclosed. FIGS. 1-6 represent a preferred embodiment of the mounting apparatus 2, generally including a base-plate 4, an artificial limb 6, a mounting strap 18, and a first line 12, which may be a string of a length of fishing line.

FIG. 1 presents the preferred embodiment of a mounting apparatus 2 being mounted to a solid body 3 such as a tree, a round post or pole, or some other readily available body. The mounting strap 18 includes a quick-release clasp 19 for lengthening or tightening the strap 18 around the body 3. The mounting strap 18 further includes a hook 22 for interfacing with the base-plate 4 through a base-plate eyelet 16. The mounting strap may attached to the base plate using the hook 22, or by tying the strap 18 directly into the base-plate eyelet, or by any other conventional means.

Figure 5:
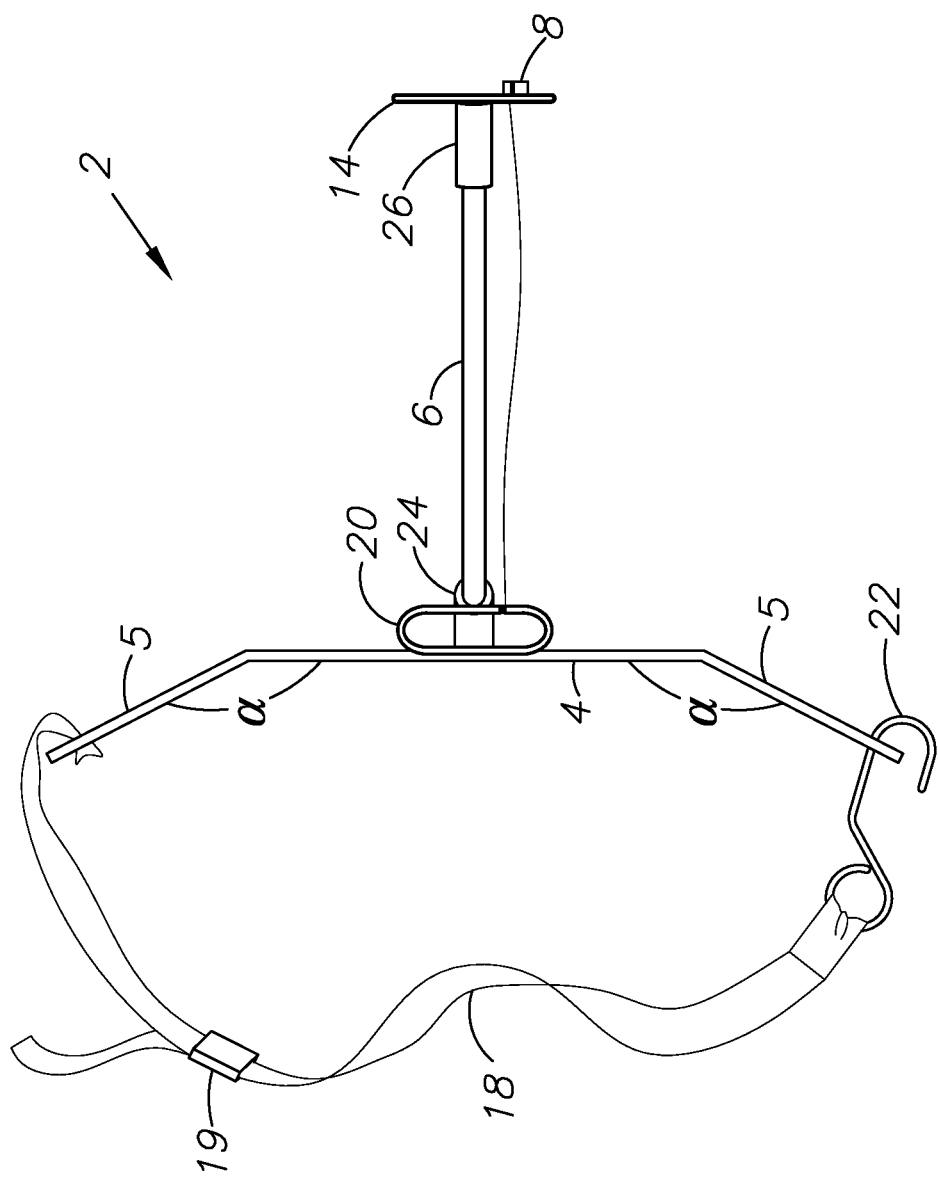
FIG. 5 is a top plan view thereof.
Figure 6:
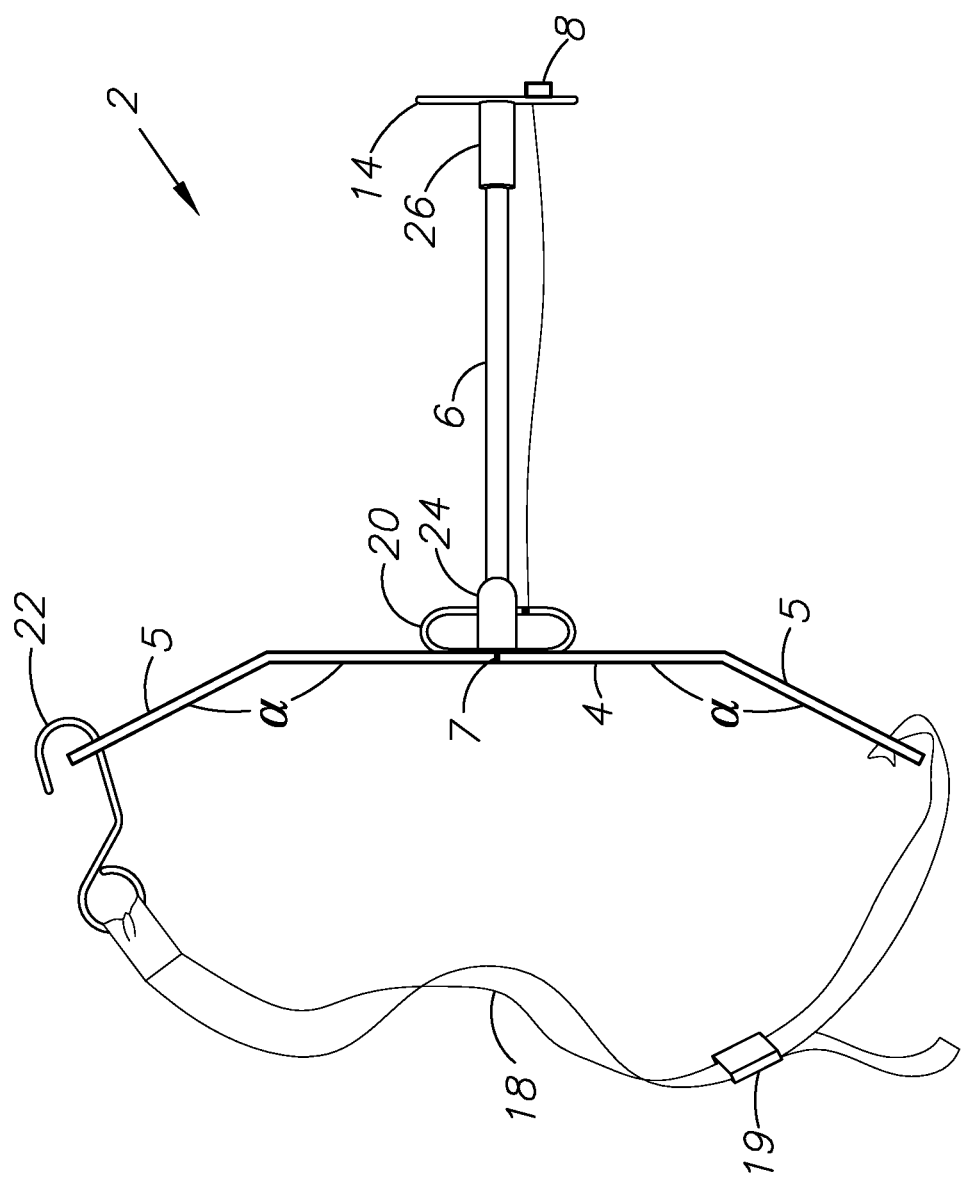
FIG. 6 is a bottom plan view thereof

The base-plate 4 includes a front face and a rear face and may be made out of steel or other durable material. The base-plate is shaped such that it provides adequate surface-to-surface contact with the solid body 3. The base-plate 4 is formed to include a pair of wings 5 on either end, and a base point 7 at its bottom edge. FIGS. 5 and 6 show the wings 5 forming an angle $\alpha$ from the main body of the base plate 4.

Figure 2:
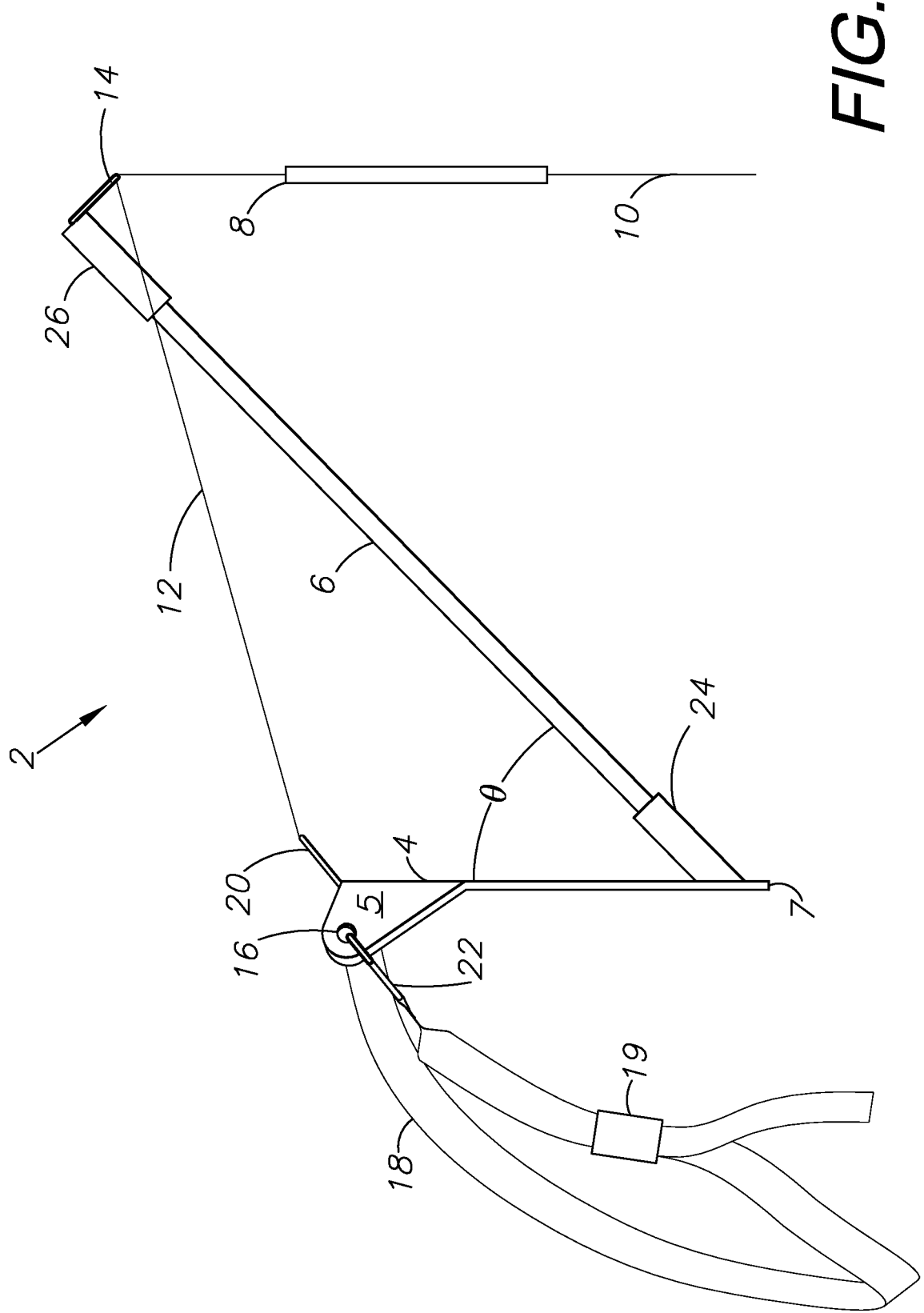
FIG. 2 is a left side elevational view thereof; the right side is a mirror image thereof.
Figure 3:
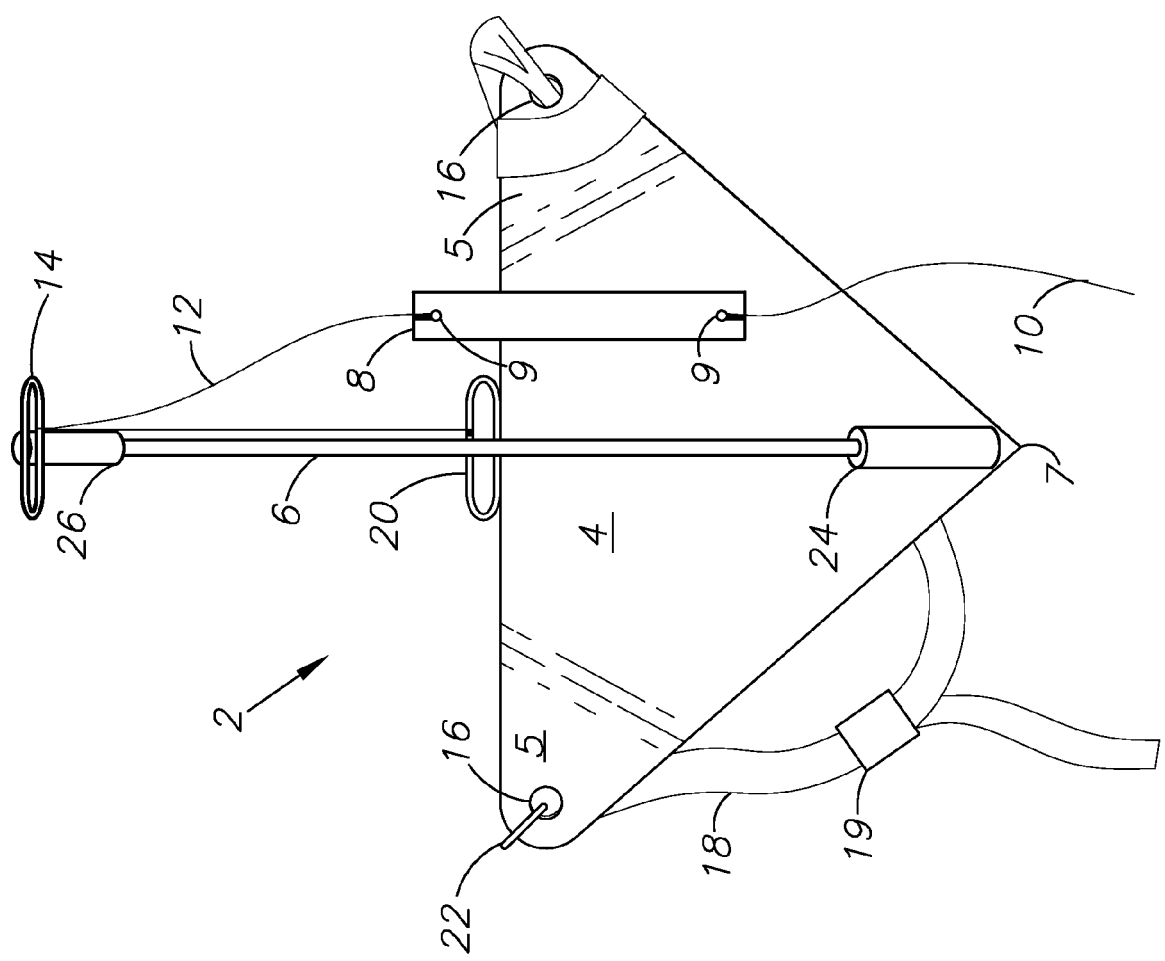
FIG. 3 is a front elevational view thereof.
Figure 4:
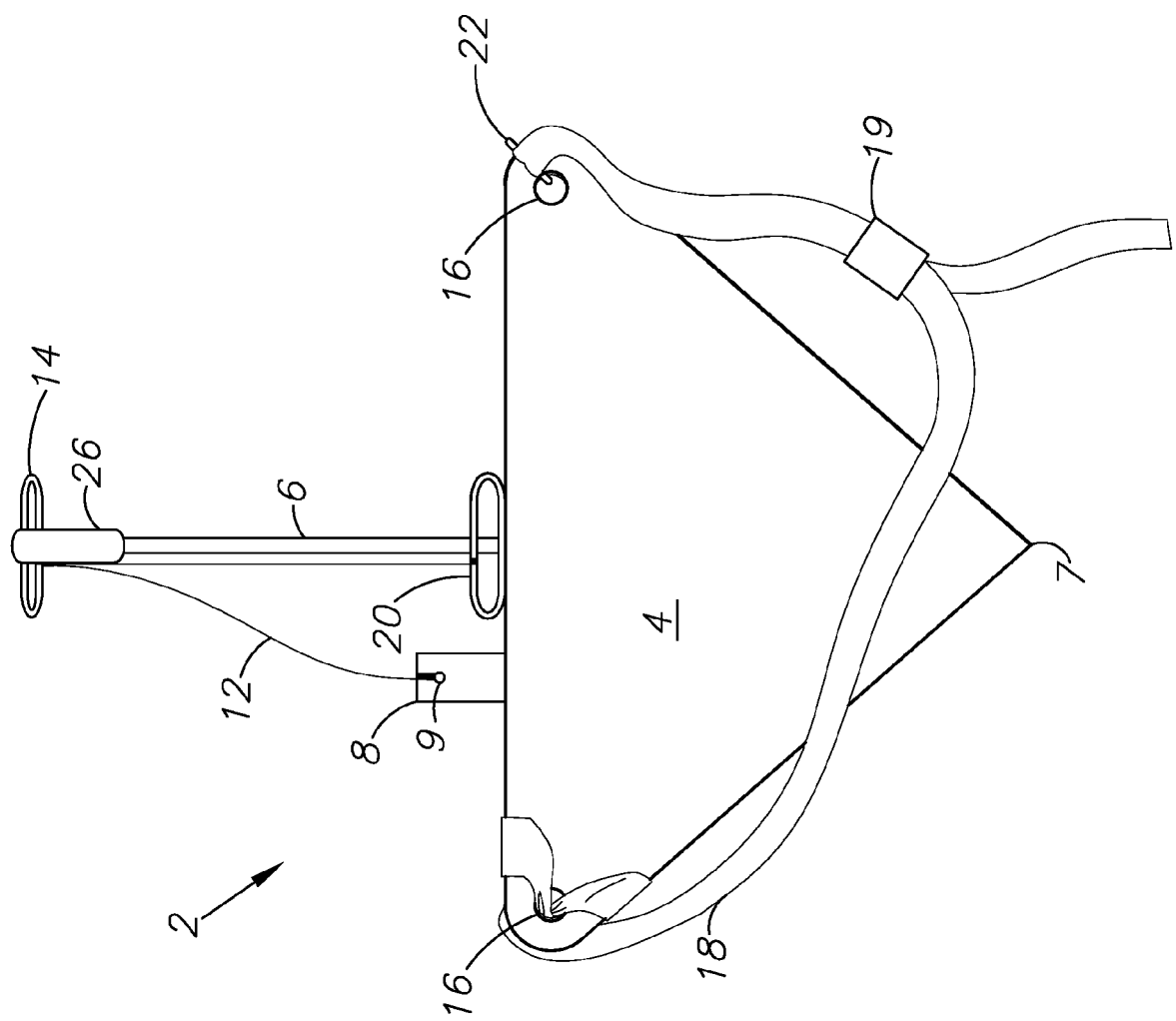
FIG. 4 is a rear elevational view thereof the bottom is a mirror image thereof.

An artificial limb 6, which may be a fibreglass-epoxy composite rod or other flexible rod, includes a proximal and distal end, and extends from the front face of the base-plate 4. FIG. 2 demonstrates an ideal angle $\theta$ at which the limb 6 extends from the base-plate 4. In the preferred embodiment, this angle $\theta$ is 45°, but any suitable angle may be used. A base-plate bolster 24 anchors the proximal end of the artificial limb 6 to the base-plate 4. The base-plate bolster 24 is welded or otherwise permanently affixed to the base-plate 4. A rod-tip bolster 26 is affixed to the distal end of the artificial limb 6.

A base-plate anchor 20 is affixed to the top edge of the base-plate 4, either by welding or through some other permanent means. A rod-tip anchor 14 is similarly affixed to the proximal end of the rod-tip bolster 26. The first line 12 is tied to the base-plate anchor, or otherwise affixed to the anchor, and feeds through the rod-tip anchor 14. This provides stability to the first line 12 and allows the line to hang away from the base-plate 4, extended out over a body of water or the ground.

The line may include a flexible separator 8, such as a piece of rubber. The separator 8 includes a pair of holes 9. The first line 12 is affixed to the separator 8 by tying the line through one hole 9. A second line 10 is affixed to the opposite end of the separator 8 by tying the second line through the second hole 9. A fish hook may optionally be attached to the end of the second line to use the mounting apparatus 2 for catching live fish.

III. Preferred Embodiment

Temporarily Mounted Fishing Rod

In the preferred embodiment, a hook may be attached to the end of the second line 10. The mounting apparatus 2 is affixed to a solid body by wrapping the strap 18 around the body and fastening the strap 18 to the base-plate 4 using hooks 22 or by tying the strap directly through the base-plate eyelets 16. The mounting apparatus 2 is placed in proximity to a body of water. The artificial limb 6 extends out over the body of water. The first line 12, flexible separator 8, and second line 10 hang through the rod-tip anchor 14 over the body of water.

A bait fish may be placed on a fishing hook affixed to the end of the second line 10. The bait fish is allowed to swim freely in the water while being restrained by the second line 10, separator 8, and first line 12. The flexibility of the separator 8 and the limb 6 allow the bait fish's swimming pattern to appear natural. When a desired fish takes the bait, it will be caught on the hook affixed to the second line 10. The flexibility of the separator 8 and limb 6 prevent the fish from breaking the mounting apparatus 2 or dislodging the apparatus from the solid body. The fish remains in water until the user claims the fish or releases it.

IV. Alternative Embodiment

Temporarily Mounted Storage Device

In an alternative embodiment, the mounting apparatus 2 may be mounted to a solid body 3 some distance above the ground. A hook or other attachment means may be placed on the end of the second line 10 to suspend an object above the ground, or the second line may be tied directly around the suspended object. The base-plate 4 functions to prevent the mounting apparatus 2 from sliding toward the ground, and the flexibility of the limb 6 and the separator 8 ensure that if the stored object is pulled or bumped, the mounting apparatus will not break.

The alternative embodiment can be used to store food or other items away from bears or other animals while the user is camping in the outdoors. The mounting apparatus 2 can be moved as the user moves from one camping site to the next with no damage to trees or other bodies. Similarly, the mounting apparatus 2 can be used to store other objects in other scenarios for temporary or long-term storage.

It will be appreciated that the components of the mounting assembly 2 can be used for various other applications. Moreover, the components of the mounting assembly 2 can be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

The invention claimed is:

1. A temporary mounting apparatus adapted for interfacing with a solid body, the mounting apparatus comprising:
   a rigid base-plate including a front face, a rear face, a top end, and a bottom end, and a pair of wings, each wing including a base-plate eyelet;
   said base-plate wings forming an angle with said base-plate front face and said base-plate rear face;
   a flexible artificial limb comprised of a rod including a proximal end and a distal end, said limb forming an angle with said base-plate and extending away from said base-plate;
   an adjustable strap affixed to said base-plate through said base-plate eyelets;
   a first length of line including a proximal and distal end;
   a base-plate anchor fixedly attached to the top end of said base-plate, said base-plate anchor including a hole;
   wherein said first length of line proximal end is fixedly attached to said base-plate anchor; and
   wherein said line extends along said limb, and ultimately suspends from said limb.

2. The mounting apparatus of claim 1, further comprising:
   a base-plate bolster including a proximal end and a distal end;
   said base-plate bolster proximal end being fixedly attached to the bottom end of said base-plate; and
   said base-plate bolster distal end being fixedly attached to the proximal end of said artificial limb.

3. The mounting apparatus of claim 1, further comprising a rod-tip bolster fixedly attached to the distal end of said artificial limb.

4. The mounting apparatus of claim 3, further comprising:
a rod-tip anchor fixedly attached to said rod-tip bolster, said rod-tip anchor including a hole; and
wherein said first length of line distal end passes through said rod-tip anchor hole.

5. The mounting apparatus of claim 1, further comprising:
a flexible separator including a proximal end and a distal end;
a second length of line including a proximal end and a distal end;
wherein said first length of line distal end is fixedly attached to said separator proximal end; and
wherein said second length of line proximal end is fixedly attached to said separator distal end.

6. The mounting apparatus of claim 5 wherein said flexible separator is comprised of a length of rubber.

7. The mounting apparatus of claim 1, wherein said first length of line is comprised of fishing line.

8. The mounting apparatus of claim 7, further comprising:
a fishing hook affixed to the distal end of said second length of line; and
wherein said mounting apparatus is configured to catch live fish.

9. The adjustable strap of the mounting apparatus of claim 1, further comprising a quick-release latch adapted for expanding and contracting said strap.

10. The mounting apparatus of claim 1, further comprising a hook fixedly attached to at least one end of said adjustable strap.

11. The mounting apparatus of claim 1, wherein said artificial limb is comprised of a flexible fibreglass-epoxy composite.

12. The mounting apparatus of claim 1, wherein the angle formed between said artificial limb and said base-plate is 45 degrees.

13. A temporary mounting apparatus adapted for interfacing with a solid body, the mounting apparatus comprising:
a rigid steel base-plate including a front face, a rear face, a top end, and a bottom end, and a pair of wings, each wing including a base-plate eyelet;
said base-plate wings forming an angle with said base-plate front face and said base-plate rear face;
a flexible artificial limb comprised of a flexible fibreglass-epoxy composite rod including a proximal end and a distal end, said limb forming an angle with said base-plate and extending away from said base-plate;
a base-plate bolster including a proximal end and a distal end, said base-plate bolster proximal end being fixedly attached to the bottom end of said base-plate, and said base-plate bolster distal end being fixedly attached to the proximal end of said artificial limb;
a base-plate anchor fixedly attached to the top end of said base-plate, said base-plate anchor including a hole;
a rod-tip bolster fixedly attached to the distal end of said artificial limb;
a rod-tip anchor fixedly attached to said steel rod-tip bolster, said rod-tip anchor including a hole;
an adjustable strap including a quick-release latch, said strap affixed to said base-plate through said base-plate eyelets;
a first length of line including a proximal end affixed to said base-plate anchor, and distal end extending through said hole within said rod-tip anchor;
a second length of line including a proximal end and a distal end;
a flexible separator including a proximal end and a distal end;
wherein said first length of line distal end is fixedly attached to said separator proximal end; and
wherein said second length of line proximal end is fixedly attached to said separator distal end.

14. The mounting apparatus of claim 13, further comprising:
a fishing hook affixed to the distal end of said second length of line; and
wherein said mounting apparatus is configured to catch live fish.

* * * * *